United States Patent
Castro

[11] Patent Number: 5,904,117
[45] Date of Patent: May 18, 1999

[54] NOVELTY COMBINATION FEEDING AND WATERING DEVICE

[76] Inventor: Frank P. Castro, 2108 Brighton Pl., Harvey, La. 70058

[21] Appl. No.: 09/047,466

[22] Filed: Mar. 25, 1998

[51] Int. Cl.⁶ ............................................. A01K 5/02
[52] U.S. Cl. ............................................. 119/51.5
[58] Field of Search .................... D30/121, 125, D30/129, 131, 132, 133; 119/51.01, 51.5, 52.1, 54, 61, 165, 166, 168

[56] References Cited

U.S. PATENT DOCUMENTS

| D. 368,790 | 4/1996 | Sternberg | D30/129 |
| D. 392,075 | 3/1998 | Holt | D30/129 |
| 4,644,903 | 2/1987 | Shaver | 119/51.01 |
| 4,854,267 | 8/1989 | Morrow | 119/166 X |
| 4,947,796 | 8/1990 | Robinette | 119/51.5 |
| 5,058,528 | 10/1991 | Counseller et al. | 119/165 |
| 5,819,686 | 10/1998 | Credeur | 119/51.5 |

*Primary Examiner*—Thomas Price
*Attorney, Agent, or Firm*—Smith, Gambrell & Russell, LLP; Beveridge, DeGrandi, Weilacher & Young Intellectual Property Group

[57] ABSTRACT

A novelty combination feeding and watering device having feeding and drinking facilities incorporated within a design which resembles, proportionally, actual toilets found in the household.

10 Claims, 3 Drawing Sheets

NOVELTY COMBINATION FEEDING AND WATERING DEVICE

FIELD AND BACKGROUND OF THE INVENTION

The present invention relates generally to a novelty animal nourishment center. With more particularity, a preferred embodiment of the present invention relates to domesticated canine combination feeding and watering device which is proportionally shaped, in a general sense, to resemble an actual toilet apparatus commonly found in households today.

Conventional combination feeding and watering devices have been heretofore proposed but have not taken on the novelty form of an actual toilet apparatus. An example of such a conventional combination device is disclosed by Clugston in U.S. Pat. No. 4,192,256. Conventional devices such as that taught by Clugston have lacked novelty aspects which distinguish them from other competing devices. The fact that these conventional devices lack such a novelty aspect has prevented them from becoming popular as an amusing gift or as the subject of a practical joke. Further, a feeding and watering device which includes some sort of novelty aspect would no doubt quickly become a conversation piece when viewed by a homeowner's guests.

It therefore is an object of the present invention to provide a combination feeding and watering device which, as a novelty aspect, has the likeness of an actual toilet apparatus.

SUMMARY OF THE INVENTION

It is common knowledge among pet owners, and more particularly among canine owners, that animals frequent the household toilet bowls for thirst relinquishment. This activity has many pet owners upset, disgusted and/or humored.

The present invention is based on this propensity of pets to drink from the household toilet. The invention therefore provides a device which has both feeding and drinking facilities in a structure resembling actual toilets found in the household. When scaled down to an appropriate size, the bowl of a toilet is perfectly suited for holding water while the top of the tank is easily modified, from the stand point of manufacturing, to define a food product holding container. As the device has the likeness of an actual toilet apparatus, it is a humorous practical joke gift for dog owners who are annoyed and/or disgusted that their animals drink from the toilet bowl.

So that the present invention is realistic, a variation of the preferred feeding and watering device includes a seat which may be fixed in an up position or fixed in a down position. Preferably, however, such a seat is pivotally connected to the feeding and watering device such that the seat may be selectively disposed in either the up or down position. Thus, the seat could be placed in the down position at times, for example, when the owner of a canine wants to prevent the canine from drinking too much water.

Advantageously, the tank portion of the invention may double as a storage chamber for food and/or for water which can replenish water in the bowl via a passage. The materials of construction and dimensions of the invention may vary according to aesthetics and according to the size of the animal intended to feed and drink therefrom.

In addition to the novelty aspects of the present invention, the relative heights of the feeder and the water bowl provide several advantages not present in conventional feeders. For instance, the relative position of the feeding container, i.e., on the top of the tank portion, allows the feeding container to be placed at an advantageous height for an animal to feed. Thus, the animal need not move from the left to the right (or vice versa) to feed and/or drink, but only merely needs to adjust its neck and/or upper body.

Therefore, in one aspect of the present invention, the feeding and watering device comprises a base stand and a bowl portion supported in elevation above the base stand. The bowl portion defines a drinking container for holding water wherein access to the drinking container is provided by an opening at the top side thereof. A tank portion also is provided and is supported at an position elevated with respect to the base. The tank portion extends above the top side of the bowl portion. At an upper end of the tank portion, a feeding trough defined by a continuous surface is provided which defines a feeding container for holding food product, and preferably a predetermined amount of food, depending on how much food the canine is to eat each day.

In a variation of the above described preferred embodiment, the feeding and watering device further comprises a seat supported above the bowl portion and a handle attached to the tank portion. Further, the tank portion, in another variation, defines a first interior chamber and a second interior chamber and the first interior chamber is in at least selective communication with the drinking container. The second interior chamber, on the other hand, is separate from the first interior chamber and precluded from communication with the drinking container of the bowl portion. In still a further variation, at least a portion of the feeding trough extends into the interior chamber of the tank portion to increase the holding capacity of the feeding container.

BRIEF DESCRIPTION OF THE DRAWINGS

To provide a further understanding of the above objects and advantages of the present invention, a detailed description of a preferred embodiment of the present invention follows which makes reference to the appended drawings, in which.

DETAILED DESCRIPTION OF A PREFERRED EMBODIMENT

Figure 1:
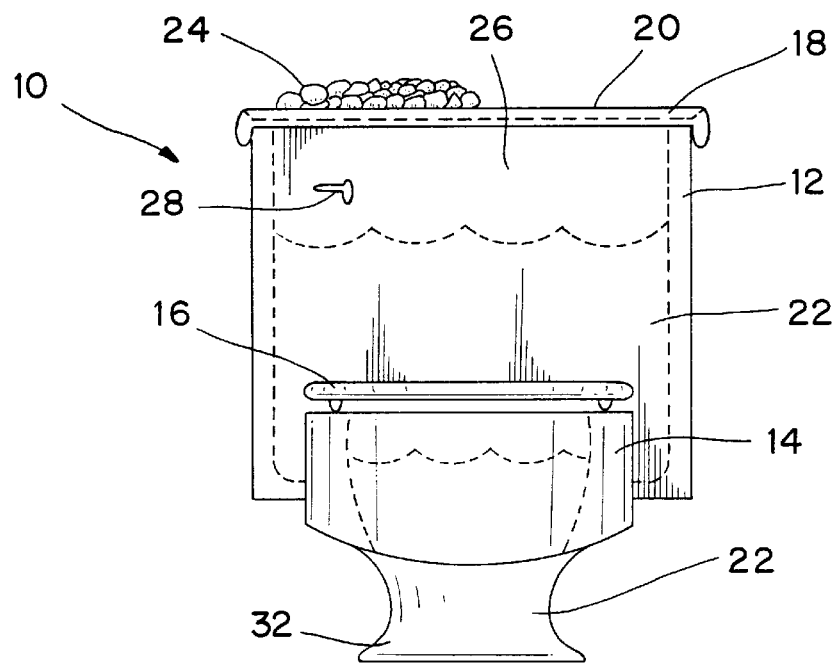
FIG. 1 is a front view of a preferred embodiment of the invention.

Referring to FIGS. 1–5, an embodiment of the inventive feeding and watering novelty device is generally shown as 10. The device 10 includes a tank portion 12 connected with a bowl portion 14. The tank portion 12 and the bowl portion 14 may be formed from porcelain by, for example, a manufacturing method similar to methods used to form actual toilet apparatuses. Preferably, however, the tank portion 12 and bowl portion 14 are formed from a plastic, by any suitable and conventional method, and then, even more preferably, provided with a high gloss finish to simulate the finish of an actual toilet apparatus. Other materials, such as other ceramic materials, metals, etc. may also be suitably used with the present invention. Forming the tank portion 12 and the bowl portion 14 from a plastic material rather than any other material however is preferred from the standpoint of cost reduction. The device preferably is white in color to resemble the typical color of actual toilet apparatuses but may be any desirable color. Coloring of the device 10 may be accomplished by painting, dying or any other color processing methods known to one of ordinary skill in the art for the selected material.

The bowl portion 14 defines an interior containment area which is adapted to hold drinking water 22 for the animal. For this purpose, an opening which approximates proportionally the opening of a standard toilet apparatus is provided at the top end of the bowl portion 14. The bowl portion 14 is elevated above ground level by means of a support 32 which preferably is integrally connected therewith. The support 32 may be as shown in the drawings or may be elongated so that a portion thereof also supports the tank portion. The elevated bowl portion 14 therefore provides a more easily reachable drinking container than a conventional water bowl which is typically placed directly on the ground.

The tank portion 12 may be a solid member, but preferably defines a cavity which may advantageously be used as a storage chamber 26. The storage chamber 26 may be used to store water 22 so that bowl portion 14 may be readily replenished in a quick and convenient manner. In such an embodiment, a passage 34 is provided between the tank portion 12 and the bowl portion 14 to allow for fluid communication therebetween. Water 22 in the bowl portion 14 can be replenished from water 22 in the storage chamber 26 through the passage 34 automatically by means of gravity and an appropriate pressurization system, or by means of an appropriate valve mechanism such as a simple pivotable flap passage obstruction. Further, a pumping mechanism (not shown) may also be employed for the purpose of filling the bowl portion 14 with water 22 contained in the storage chamber 26.

Access is provided to the storage chamber 26 via an opening at the top of the tank portion 12 which approximates proportionally the opening provided on the tank of an actual toilet apparatus. A lid portion 18 engages the top of the tank portion 12 to close the opening and to prevent access to the storage chamber 26. The lid portion includes a trough 20 which serves as a reservoir for food product 24 for the animal.

Figure 2:
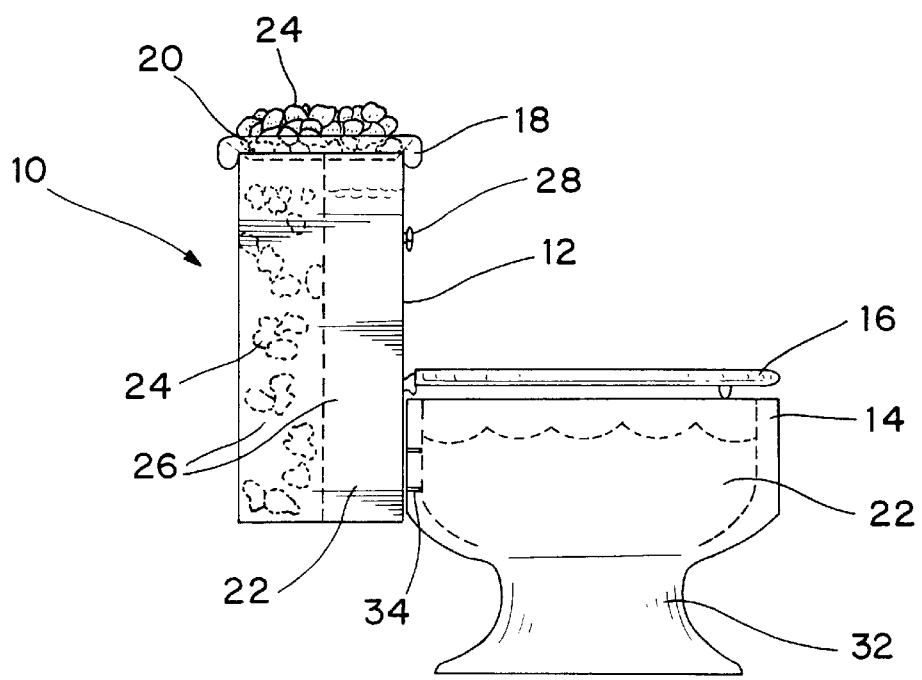
FIG. 2 is a side view of the embodiment of the invention shown in FIG. 1.
Figure 3:
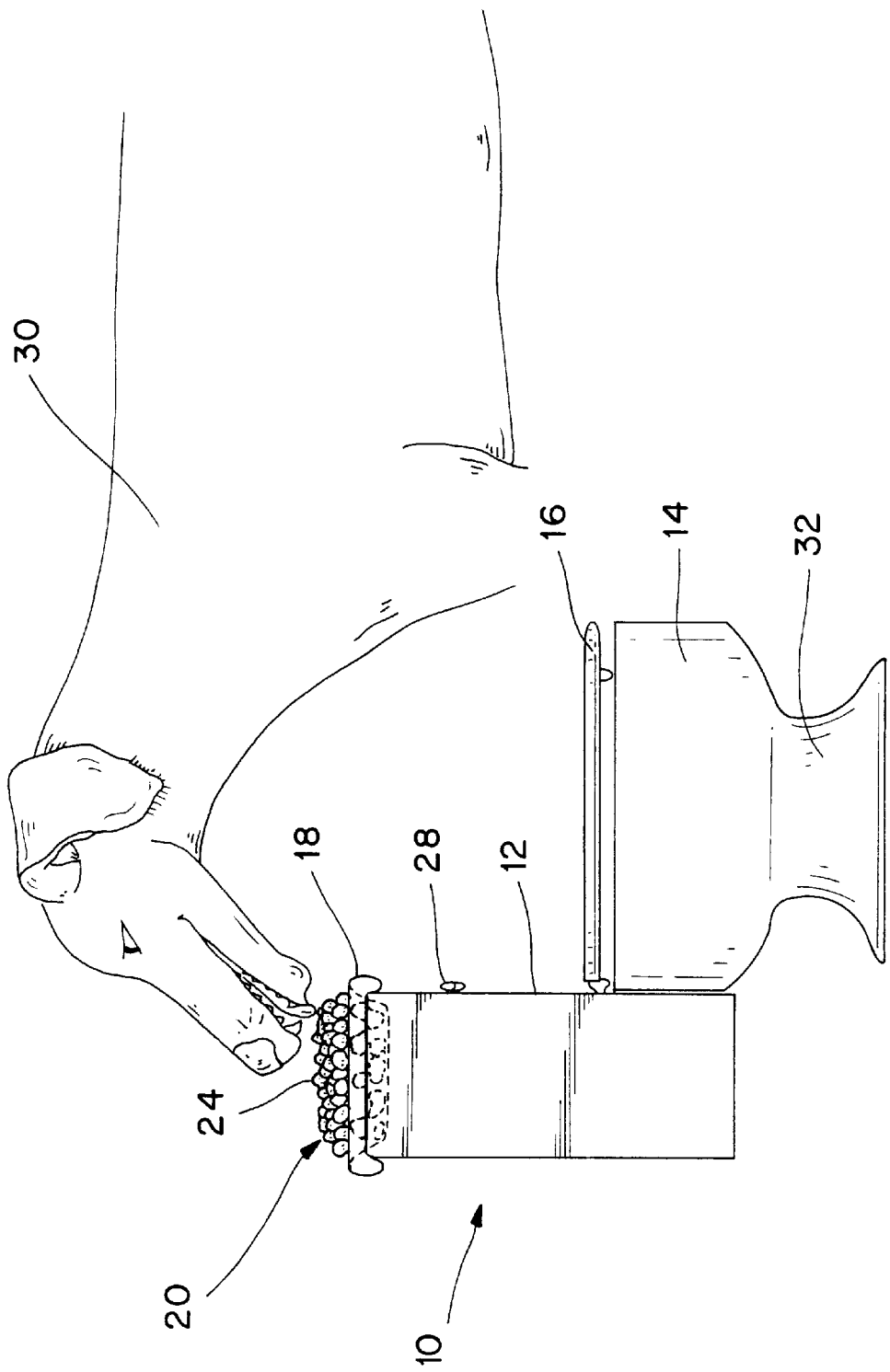
FIG. 3 is a exemplary view of the invention in use by a canine.
Figure 4:
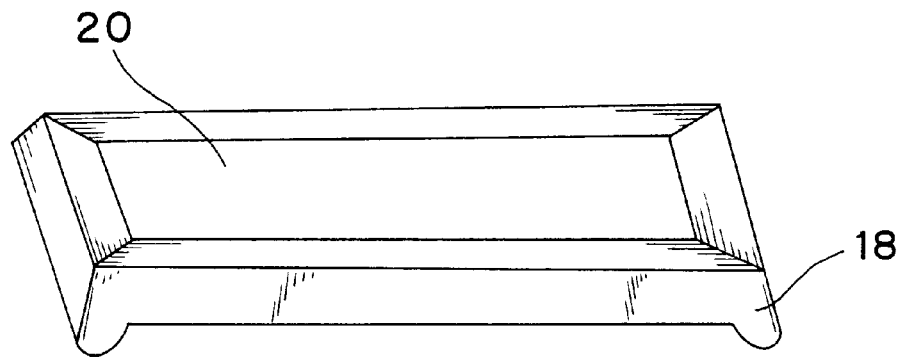
FIG. 4 is a perspective view of an example of the lid of the present invention and particularly illustrates the feeding trough.

Preferably, the trough, best seen in FIG. 4, is formed of a continuous surface. The depth of the trough 20 is variable depending on the food requirements of the animal intended to feed from the device 10. The trough 20 therefore may extend slightly into the storage chamber (for example, as shown in FIG. 2) or extend substantially into the storage chamber (for example, as shown in FIG. 3). If a large amount of food product 24 is not required by the animal, the trough 20 may be set at a shallow depth which does not extend within the storage chamber 26 (for example, as shown in FIG. 1). Preferably, various lids 18 having troughs 20 of various depths may be switchably utilized with a single device 10.

In the embodiment of the invention in which the tank portion 12 is a solid member, i.e., without a storage chamber 26, a lid 18 may be seated on an upper portion thereof or the feeding trough 20 may be integrally formed by the upper surface of the tank portion 12.

As shown in FIG. 3, an animal, for instance, a domesticated canine 30, may stand at a single location and feed from food product 24 disposed in the trough 20 and drink from water 22 disposed in the bowl portion 14 by a simple movement of the neck and/or upper body.

The storage chamber 26 also may include a partition which defines two separate chambers, i.e., first and second chambers, as shown in FIG. 2. In such a variation, water 22 for replenishing the bowl portion 14 may be suitably stored in one portion of the storage chamber 26 while food product 24 for replenishing the feeding trough 20 may be stored in the other portion. The lid 18 is removed to gain access to the stored food product 24 while the water 22 in the bowl portion 14 may be directly replenished from the water portion of the storage chamber 26 via the passage 34.

Figure 5:
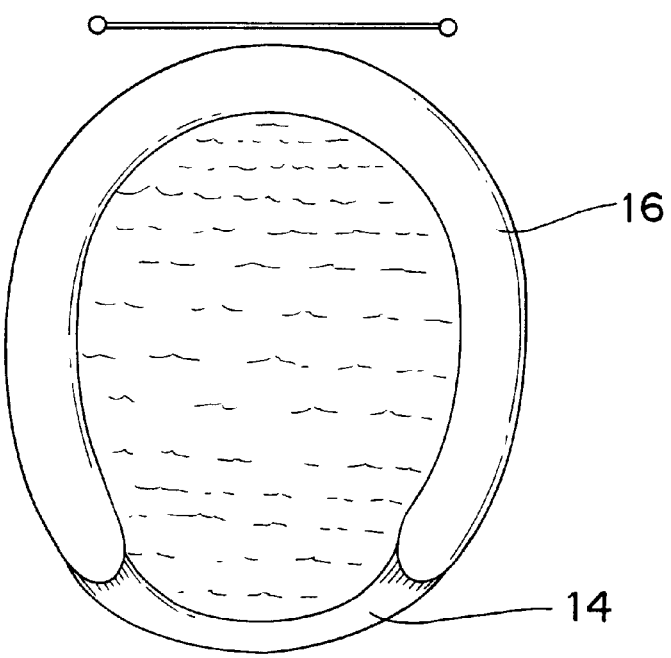
FIG. 5 is a top view of one preferred seat which may be used in conjunction with other features of the present invention.

For providing the novelty device 10 with the likeness of an actual toilet apparatus, a toilet seat 16 and a handle 28 also preferably are provided. The toilet seat 16 may be fixed in an up position (i.e., against the tank portion) or in a down position (i.e., against the bowl portion 14) but preferably is movable between and positionable in these two locations in a manner similar to the positionable lid on an actual toilet apparatus. The toilet seat 16 contains at least an opening through the center thereof, as best shown in FIG. 5, preferably in proportion to the opening in an actual seat of a toilet apparatus, which provides the animal access to the drinking water 22 when the seat portion 16 is permanently in a down position. The seat portion 16, in the movable variation, is coupled to the bowl portion 14 by a hinge mechanism, and preferably by a hinge mechanism similar to those commonly used for seats of actual toilet apparatuses. Such a mechanism also preferably may allow for removal of the seat portion 16, for example, for cleaning purposes, in a similar manner to actual toilet seats. Other types of hinges, however, may also be suitably used. The moving seat 16 may be solid or contain an access opening. The solid seat would allow the owner to regulate the amount of water 22 an animal is drinking by placement in the down position and thereby precluding access to the water 22 in the bowl portion 14.

The handle 28 is provided at a location proportionately similar to the location of the flushing handle of an actual toilet apparatus. The handle 28 may merely be a novelty, i.e., to imitate the likeness of an actual toilet apparatus, or may be operationally connected to the valve mechanism, for example, a flap-type pivoting valve, which provides passage of water 22 from the storage chamber 26 to the bowl portion 14 when replenishing of drinking water 22 is desired.

The device 10 may be formed in various sizes and heights to accommodate different sized animals. As stated above, the device 10 should be sized such that an animal may feed and drink therefrom without moving the position of its feet. Further, the proportionality of the device 10 may be skewed in relation to actual toilet apparatuses for the purpose of providing more or less water or food by increasing or decreasing the bowl portion 14 and trough 20, respectively.

Both the seat portion 16 and the lid 18 advantageously may be removable for cleaning and/or replacement, and in regard to the lid 18, for providing access to the storage chamber 26.

While preferred embodiments of the invention have been described and illustrated, it is to be understood that these embodiments are merely examples of the invention. As such, many variations and modifications will be apparent to those of ordinary skill in the art, these variations and modifications being included in the scope and spirit of the invention as defined in the appended claims.

I claim:

1. A novelty feed and water bowl, comprising:

a base stand;

a bowl portion supported above said base stand such that said bowl portion is elevated, said bowl portion defining a drinking container for holding water, access to said drinking container being provided by an opening at a top side of said bowl portion;

a tank portion supported at an position elevated with respect to said base stand, said tank portion extending above said top side of said bowl portion and including an upper end; and a feeding trough provided at said upper end of said tank portion, said feeding trough defining a feeding container for holding food product and said feeding container being defined by a continuous surface;

and a lid portion removably engaged with said upper end of said tank portion, said feeding trough being provided in said lid portion.

2. The novelty feed and water bowl defined in claim 1, wherein:

said tank portion defines a first interior chamber having an opening at said upper end.

3. The novelty feed and water bowl defined in claim 2, wherein:

said first interior chamber is in at least selective communication with said drinking container of said bowl portion.

4. The novelty feed and water bowl defined in claim 2, wherein:

said tank portion further defines a second interior chamber having an opening at said upper end, said second interior chamber being separate from said first interior chamber, said second chamber being precluded from communication with said drinking container of said bowl portion.

5. The novelty feed and water bowl defined in claim 1, wherein:

at least a portion of said feeding trough extends into an interior chamber of said tank portion.

6. The novelty feed and water bowl defined in claim 5, wherein:

a substantial portion of said feeding trough extends into an interior chamber of said tank portion.

7. The novelty feed and water bowl defined in claim 1, further comprising:

a seat supported above said bowl portion; and a handle attached to said tank portion.

8. The novelty feed and water bowl defined in claim 7, wherein:

said seat is pivotally engaged with the novelty feed and water bowl.

9. The novelty feed and water bowl defined in claim 1, wherein:

said drinking container and said feeding container are relatively located such that each is accessible to a stationary animal.

10. A novelty feed and water bowl, comprising:

a base stand;

a bowl portion supported above said base stand such that said bowl portion is elevated, said bowl portion defining a drinking container for holding water, access to said drinking container being provided by an opening at a top side of said bowl portion;

a tank portion supported at a position elevated with respect to said base stand, said tank portion extending above said top side of said bowl portion and including an upper end; and a feeding trough provided at said upper end of said tank portion;

a lid portion removably engaged with said upper end of said tank portion, said lid portion including said feeding trough defining a feeding container for holding food product, said feeding container being defined by a continuous surface;

a seat supported above said bowl portion; and a handle attached to said tank portion;

wherein said tank portion defines a first interior chamber and a second interior chamber each having openings at said upper end, said first interior chamber being in at least selective communication with said drinking container of said bowl portion, said second interior chamber being separate from said first interior chamber and precluded from communication with said drinking container of said bowl portion;

at least a portion of said feeding trough extends into said interior chamber of said tank portion;

said seat is pivotally engaged with the novelty feed and water bowl; and said drinking container and said feeding container are relatively located such that each is accessible to a stationary animal.

* * * * *